US006449240B1

(12) United States Patent
Kikukawa et al.

(10) Patent No.: US 6,449,240 B1
(45) Date of Patent: Sep. 10, 2002

(54) SYSTEM, METHOD AND INFORMATION MEDIUM FOR STORING AND READING INFORMATION AS A DIFFERENCE IN A SURFACE POTENTIAL OR A SURFACE CHARGE DENSITY

(75) Inventors: Takashi Kikukawa; Hajime Utsunomiya; Takuya Tsukagoshi, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/536,619

(22) Filed: Mar. 28, 2000

(30) Foreign Application Priority Data

Mar. 29, 1999 (JP) .......................................... 11-087133
Nov. 16, 1999 (JP) .......................................... 11-326089

(51) Int. Cl.[7] .............................. G11B 7/24; B32B 3/00
(52) U.S. Cl. ............... 369/275.1; 428/64.1; 430/270.13
(58) Field of Search ................................. 369/276, 116, 369/59.1, 275.2, 275.4, 284, 275.1, 283, 288; 428/64.1, 64.4, 64.5, 64.6, 64.2; 430/19, 270.13, 495.1, 945

(56) References Cited

U.S. PATENT DOCUMENTS

| 5,637,372 A | * | 6/1997 | Tominaga et al. ......... 428/64.1 |
| 5,652,036 A | * | 7/1997 | Kobayashi |
| 5,675,532 A | * | 10/1997 | Gemma et al. ............. 365/151 |
| 5,800,950 A | * | 9/1998 | Hirao et al. ................... 430/1 |
| 5,863,702 A | * | 1/1999 | Ohbayashi et al. .... 430/270.13 |

FOREIGN PATENT DOCUMENTS

| JP | 8-212604 | 8/1996 |
| JP | 10-172187 | 6/1998 |
| JP | 10-320865 | 12/1998 |

* cited by examiner

Primary Examiner—Ali Neyzari
(74) Attorney, Agent, or Firm—Oblon, Spivak, McClelland, Maier & Neustadt, P.C.

(57) ABSTRACT

An information medium capable of recording the information at a high density in a convenient manner is provided. Also provided is a method capable of readily reproducing the information recorded at such high density, and a system which can be used therefor. In the present invention, the information is read by reading difference in crystallographic state, crystallographic phase or constituent material as a difference in surface potential or surface charge density.

5 Claims, 4 Drawing Sheets

SYSTEM, METHOD AND INFORMATION MEDIUM FOR STORING AND READING INFORMATION AS A DIFFERENCE IN A SURFACE POTENTIAL OR A SURFACE CHARGE DENSITY

BACKGROUND OF THE INVENTION

1. Field of the Invention

This invention relates to an information medium, and a method and a system for reading the information wherein pattern of the information recorded at a high density can be readily reproduced.

2. Prior Art

Magnetic recording and optical recording have been employed for the purpose of high density recording. Hard disc drives and magnetic tape drives are typical magnetic recording systems, and magnetooptical recording system and phase change recording system are typical optical recording systems.

Such conventional recording using the magnetic and optical systems, however, suffer from signal detection limit intrinsic to the respective systems.

For example, in the case of the magnetic recording, reduction in size of the record marks invites disappearance of the record marks (reversely magnetized areas) even at room temperature due to instabilization of magnetic domain walls by thermal perturbation. In the case of hard disc drives wherein magnetoresistance effect element is used for the reading, reduction in size of the record marks results in reduced fluctuation of the magnetic field intensity, and a detection limit is also imposed in this respect.

On the other hand, in the case of the optical recording, signal detection limit is imposed by the diffraction limit determined by the wavelength of the light used for reading and numerical aperture of the reading optical system.

In view of such situation, Japanese Patent Kokai No. (JP-A) 1998/172187 proposes use of a medium comprising a charge storage material wherein recording and erasure is effected by charge transfer, and the information recorded is reproduced by detecting fluctuation in charge, surface potential, or capacitance using a scanning probe microscope (SPM).

The recording medium and the recording method described in JP-A 1998/172187 are not very easy to accomplish in general use. In an embodiment of JP-A1998/172187, the medium comprises a conductive silicon substrate and a silicon oxide film, a silicon nitride film, and a silicon oxide film disposed in this order on the substrate to form a charge storage layer, and the recording is effected by creating potential difference on the medium through charge transfer using an atomic force microscope (AFM).

SUMMARY OF THE INVENTION

In view of the situation as described above, an object of the present invention is to provide an information medium wherein the information can be recorded at a high density in a convenient manner, and the information recorded at such high density can be reproduced in a convenient manner. Another a object of the present invention is to provide a method for reproducing the information recorded in such medium, and a system for reproducing the information wherein such method is utilized.

Such objects are attained by the present invention as described in (1) to (4), below.

(1) An information medium wherein the information recorded is read by reading difference in crystallographic state, crystallographic phase or constituent material as a difference in surface potential or surface charge density.

(2) A method for reading information recorded in a medium wherein the information is read by reading difference in crystallographic state, crystallographic phase or constituent material as a difference in surface potential or surface charge density.

(3) A method for reading information according to the above (2) wherein the method is applied to a phase change recording medium, and difference between crystalline region and amorphous region is read as a difference in surface potential or surface charge density.

(4) A system for reading information recorded in a medium wherein the information is read by reading difference in crystallographic state, crystallographic phase or constituent material as a difference in surface potential or surface charge density.

DETAILED DESCRIPTION OF THE INVENTION

Figure 1:
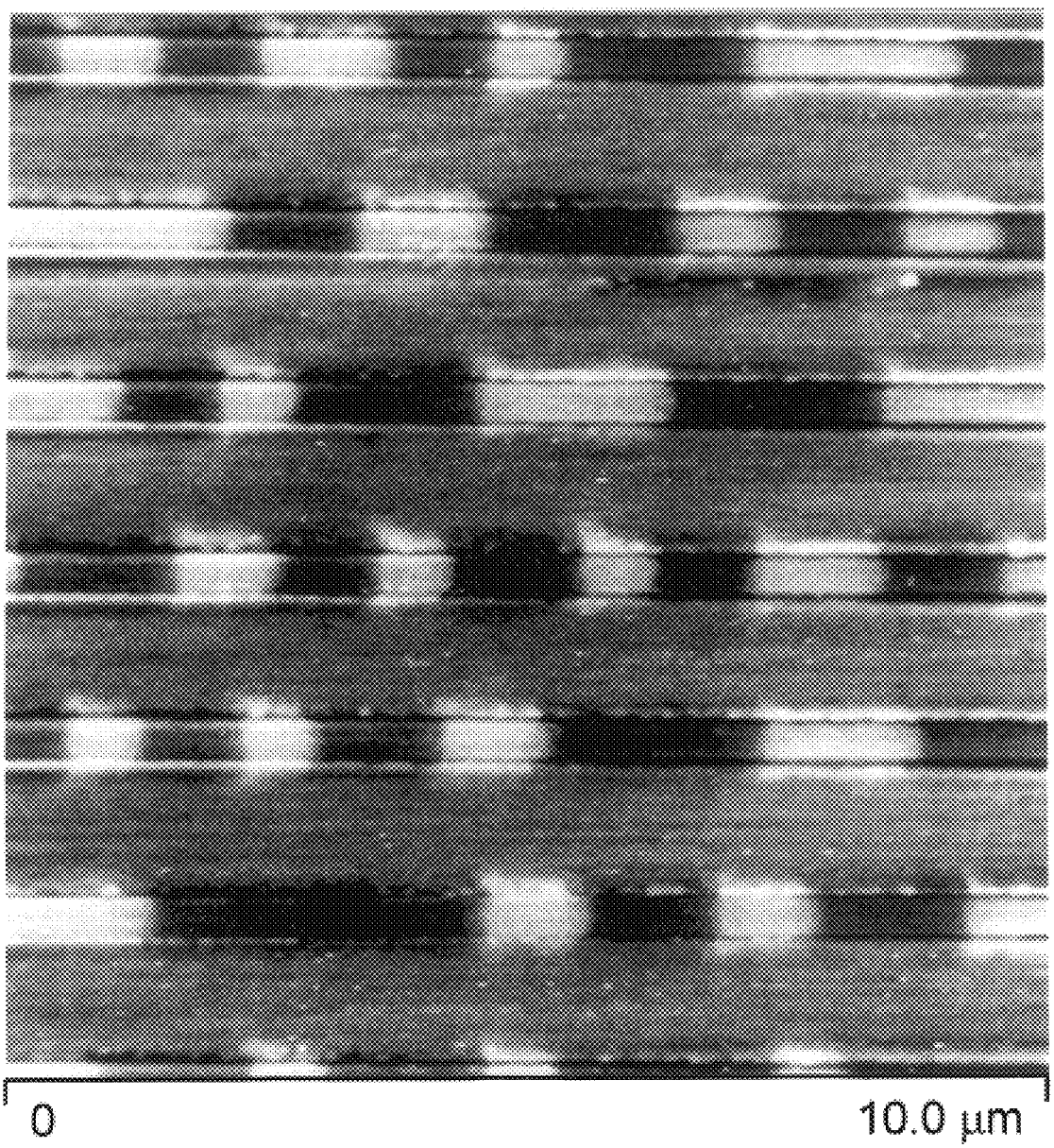
FIG. 1 is a photographic image of the surface potential distribution of the recording layer of the phase change recording disc taken by SPM to show the crystallographic structure.

In the present invention, the information is recorded such that the regions having different crystallographic state, crystallographic phase or constituent material constitute the record marks, and the information is reproduced by detecting and reading the difference in the crystallographic state, crystallographic phase or constituent material as a difference in surface potential or surface charge density. Work function will be different when the constituent material is different. Even if the constituent material were the same, work function will be different when crystallographic state or crystallographic phase is different. When the work function is different, surface potential will be different to enable the reading in the present invention.

The present invention is applicable, for example, to a phase change recording medium.

Phase change recording medium is a well known optical recording medium wherein difference in reflectivity between the amorphous region and the crystalline region is utilized for the formation of the information-recorded pattern. In the phase change recording medium, not only the difference in reflectivity but also difference in the work function is found between the amorphous region and the crystalline region, and a method for reading the record marks as the regions of different work function is disclosed in JP-A 1988/320865. In the method of JP-A 1988/320865, however, a laser beam or an is directed to the medium to induce electron emission from the medium depending on the work function of the region, namely, depending on whether the region is amorphous or crystalline, and the information is read in terms of the quantitative or energy distribution of the electrons. Therefore, this method is different from the method of the present invention. In addition, the system used for the reading is complicated in JP-A 1988/320865 since a means for the electron emission is necessary in addition to the probe used for detecting the electron emitted from the medium.

JP-A 1996/212604 discloses a method wherein information recorded in a phase change recording medium is read by using the difference in electric resistance between the amorphous and the crystalline regions. The method of JP-A 1996/212604, however, requires use of a medium wherein a film of phase change material is formed on an electroconductive substrate such as a platinum thin film, and contact of the electroconductive probe with the film of the phase change material upon reading of the information. Therefore, severe restriction is imposed on the medium design, and reliable reading of the information at a high speed is impossible.

In contrast, when a phase change recording medium is used in the present invention, difference in work function between the amorphous and the crystalline regions is read in terms of the difference in surface potential, and the reading can be accomplished while the medium is in electrically isolated state. There is no need to form an electroconductive film, and the medium of ordinary constitution comprising a resin substrate and a film of phase change material thereon can be used with no additional change in its constitution. In addition, a highly reliable reading at a high speed can be realized since there is no need to contact the electroconductive probe with the substrate. The reading by converting the difference in work function to the difference in surface potential may be realized, for example, by using a scanning probe microscope (SPM) at the a mode of surface potential microscope or other mode enabling such conditions.

The phase change material film of a phase change recording medium is usually electroconductive, and therefore, electric potential is substantially equivalent in the amorphous region and the crystalline region. However, the difference in the work function between the amorphous region and the crystalline region can be read out as a difference in surface potential, for example, by using an SPM in its surface potential microscope mode. In other words, the present invention has eliminated the need for preliminarily forming the difference in electric potential in the medium by charging or other means, and this is one difference of the present invention from the medium of JP-A 1998/172187. The surface potential measured in the present invention is high in the amorphous region (record mark) and low in crystalline region.

When the phase change recording medium is recorded with the laser beam, record marks of reduced size smaller than the diffraction limit can be formed by using only the central part of the beam spot for the record mark formation since the laser beam energy is normally distributed in radial direction of the beam spot. However, in the case of the reading of the record marks, limit is imposed in the readable length of the record marks by the diffraction limit as mentioned above, and the small-sized record marks formed by the method as described above are not readable by the laser beam of the wavelength the same as the one used in the recording. In contrast, presence of the small-sized record marks as well as position of the leading and trailing edges of the record marks can be clearly detected in the present invention since the record mark pattern is detected in the present invention as the pattern of surface potential distribution.

As described above, in the present invention, reproduction of the information recorded at a high density can be readily realized for the mass-producible, low cost phase change recording medium.

In the present invention, the phase change material used is not limited to any particular type, and exemplary materials include materials of Ge—Sb—Te-based composition and In—Ag—Te—Sb-based composition.

When the phase change material is of the Ge—Sb—Te-based composition as represented by the formula (I):

$$Ge_aSb_bTe_{1-a-b} \qquad (I),$$

atomic ratio of the constituent elements is preferably such that:

$0.08 \leq a \leq 0.35$, and $0.12 \leq b \leq 0.40$, and more preferably, $0.08 \leq a \leq 0.25$, and $0.20 \leq b \leq 0.40$.

When the phase change material is of the In—Ag—Te—Sb-based composition as represented by the formula (II):

$$(Ag_aIn_bSb_cTe_d)M_e \qquad (I),$$

atomic ratio of the constituent elements is preferably such that:

$0.02 \leq a \leq 0.20$, $0.02 \leq b \leq 0.20$, $0.35 \leq c \leq 0.80$, and $0.08 \leq d \leq 0.40$, $0 \leq e \leq 0.10$, and more preferably, $0.02 \leq a \leq 0.10$, $0.02 \leq b \leq 0.10$, $0.50 \leq c \leq 0.75$, $0.10 \leq d \leq 0.35$, and $0 \leq e \leq 0.10$.

It should be noted that element M is at least one element selected from H, Si, C, V, W, Ta, Zn, Ti, Ce, Tb, Ge, Sn, Pb and Y.

Record marks of minute sizes formed in the magnetic recording materials often suffer from the problem of insufficient thermal stability. The phase change recording medium has sufficient thermal stability at room temperature.

Also useful in the present invention is the change in surface potential associated with crystalline-crystalline phase change in addition to the phase change recording medium. For example, a material whose work function changes with the transfer from one crystalline phase to another crystalline phase may be used for the recording material, and the region wherein the phase has been changed may be used for the record mark. The recording material used in such case is not limited to any particular type, and the material employed is preferably the one exhibiting a relatively quick phase change. Exemplary such materials include alloy systems of the composition used for shape-memory alloy. Change in the work function associated with first order phase change of non-metal inorganic materials and organic materials are also useful.

Also useful in the present invention is the difference in surface potential due to the difference in the constituent material. For instance, the present invention is applicable to a medium wherein the record marks are formed in a dielectric matrix by arranging metal fine particles in a particular pattern, and also, to a medium wherein record marks of particular alignment are formed in an alloy matrix by precipitation of a supersaturated solid solution element in a particular pattern by an optimal heat treatment. These media are thermodynamically highly stable, and therefore, these media are highly stable when stored in high temperature conditions.

In the foregoing description, a method for reading the recorded information pattern as a difference in surface potential or a difference in surface charge density by utilizing the difference in crystallographic state, crystallographic phase or constituent material has been described. The present invention also includes a method wherein the recorded information pattern is read as a difference in surface charge density.

In the present invention, reading of the difference in surface charge density means the reading of the pattern of the distribution of the difference in crystallographic state, crystallographic phase, or constituent material by measuring capacitance or its fluctuation of the condenser formed between the electroconductive probe and the medium surface. In the measurement of the capacitance or its fluctuation, electric voltage may be applied as desired across the gap between the electroconductive probe and the medium surface.

In the case when the amount of the charge induced on the medium surface differs by the crystallographic state, crystallographic phase, or constituent material upon application of voltage between the electroconductive probe and the medium surface, the recorded information may be read by measuring the capacitance with the voltage applied. In the case wherein the work function is different in correspondence with the difference in crystallographic state, crystallographic phase, or constituent material, density of the surface charge induced on the electroconductive probe upon approaching of the probe to the surface of the medium will be different corresponding to such difference in the work function without applying voltage on the probe. In such a case, charge of the amount corresponding to the work function can be induced on the probe surface without applying voltage by appropriately adjusting the distance between the electroconductive probe and the medium surface, and information can be read out without applying voltage on the probe by measuring the capacitance. It should be noted that the capacitance may be measured under voltage application even if the record mark exhibits a substantial difference in the surface charge density with no voltage application.

The difference in capacitance may be measured by moving the electroconductive probe above the medium and detecting the electric current induced by such movement. If the surface charge density differs between the region of the record marks and the region other than the record marks, the amount of the charge induced on the probe surface will be different depending on whether the probe is located on the record marks or the region other than the record marks. Therefore, when the electroconductive probe is moved at a substantially constant speed in relation to the medium surface, the amount of the charge induced will change at the edge of the record marks, and thus, electric current is generated in the electroconductive probe. The edge of the record marks can be detected by detecting such current.

When the information is read by utilizing the difference in surface charge density, there is no need to provide an electroconductive film on the medium, and also, there is no need to contact the electroconductive probe with the medium surface.

When the information reading method of the present invention is used, the size of the phase or material constituting the record mark in the recording material of the medium can be controlled in the order of nanometers, and the reading of the surface potential and the like can also be controlled in the order of nanometers.

The difference in surface potential or the difference in surface charge density upon reading may be increased by selecting an appropriate combination of the phases or materials. When the difference is increased, signal/noise ratio of high level will be attained even when the size of the record marks are significantly reduced.

Furthermore, when multi phases or materials are present in the same medium, multilevel recording can be conducted corresponding to the difference in the work function or the like of such phases or materials.

The information reading system used in the present invention is not limited for its constitution as long as it is provided with a means for reading the difference in the crystallographic state, crystallographic phase, or constituent material of the medium as a difference in the surface potential or the surface charge density, for example, a means for reading distribution of the work function on the medium in terms of distribution of the surface potential. In the reading of the surface potential, however, it is preferable to utilize the constitution of the scanning probe microscope (SPM) as described above. When an electroconductive probe and an appropriate detection module are mounted on the SPM, the work function distribution on the medium outer surface can be read in terms of the surface potential distribution, and the information may be reproduced by appropriately processing the pattern of the surface potential distribution.

The information reading system of the present invention may also comprise a system wherein the constitution of a flying head is utilized in addition to the system utilizing the constitution of the SPM. In such a case, the flying head should be equipped with a probe capable of reading any of the various distributions as described above. In the detection of the difference in the surface potential or the difference in the surface charge density, the flying head equipped with the electroconductive probe or the like should be controlled to a substantially constant flight height (height from the medium surface). This in turn means that the information reading system of the present invention can make use of conventional flying head structures used in magnetic disc systems. As a consequence, the information reading system of the present invention is simple in structure and its production can be accomplished at low cost. In such a system, the data transfer rate can also be increased to the level of the magnetic disc systems.

It should be noted that the output of the reproduced signals fluctuates when the flight height of the flying head is influenced by the surface roughness on the medium surface. Such fluctuation in the signal output caused by the inhomogeneous thickness of the medium or the like, however, will occur at a frequency lower than the frequency of the reproduced signals, and such fluctuation in the signal output will not constitute a substantial noise in the reproduced signals.

EXAMPLES

Examples of the present invention are given below by way of illustration and not by way of limitation.

Example 1

Signals were recorded on a phase change recording disc (CD-RW disc) having a recording layer of In—Ag—Te—Sb-based composition with a CD-RW drive system.

Next, the dielectric layer, the reflective layer, and the resin protective layer that had been disposed on the recording layer were peeled off to expose the surface of the recording layer. Distribution pattern of the surface potential was processed into an image by using D 3100 SPM observation system manufactured by Digital Instruments in its surface electric potential micrometer mode. The results are shown in FIG. 1.

Figure 2:
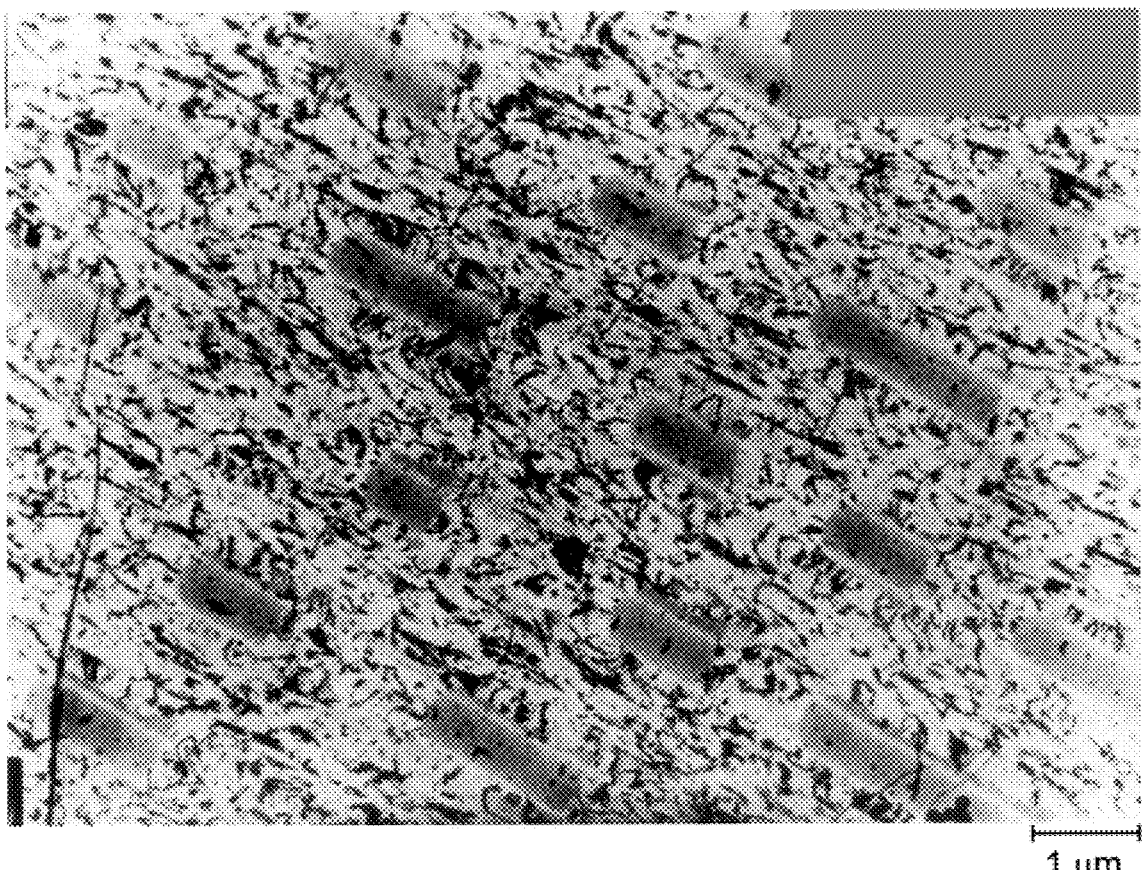
FIG. 2 is a photograph of the recording layer of the phase change recording disc taken by transmission electron microscope to show the crystallographic structure.

The recording layer of the phase change recording disc after the recording was removed from the disc, and the thus obtained recording layer was photographed with a transmission electron microscope. The photomicrograph is shown in FIG. 2.

In FIG. 1, the regions with higher lightness are the regions exhibiting the higher surface potential. In FIG. 2, the regions with lower lightness with no crystal grains are the amorphous record marks. As easily understood by comparing FIGS. 1 and 2, the regions of higher surface potential almost completely correspond to the amorphous record marks. These results demonstrate that a surface potential distribution pattern of high contrast corresponding to the record marks is obtainable by measuring the surface potential of the phase change recording medium with SPM.

Figure 3:
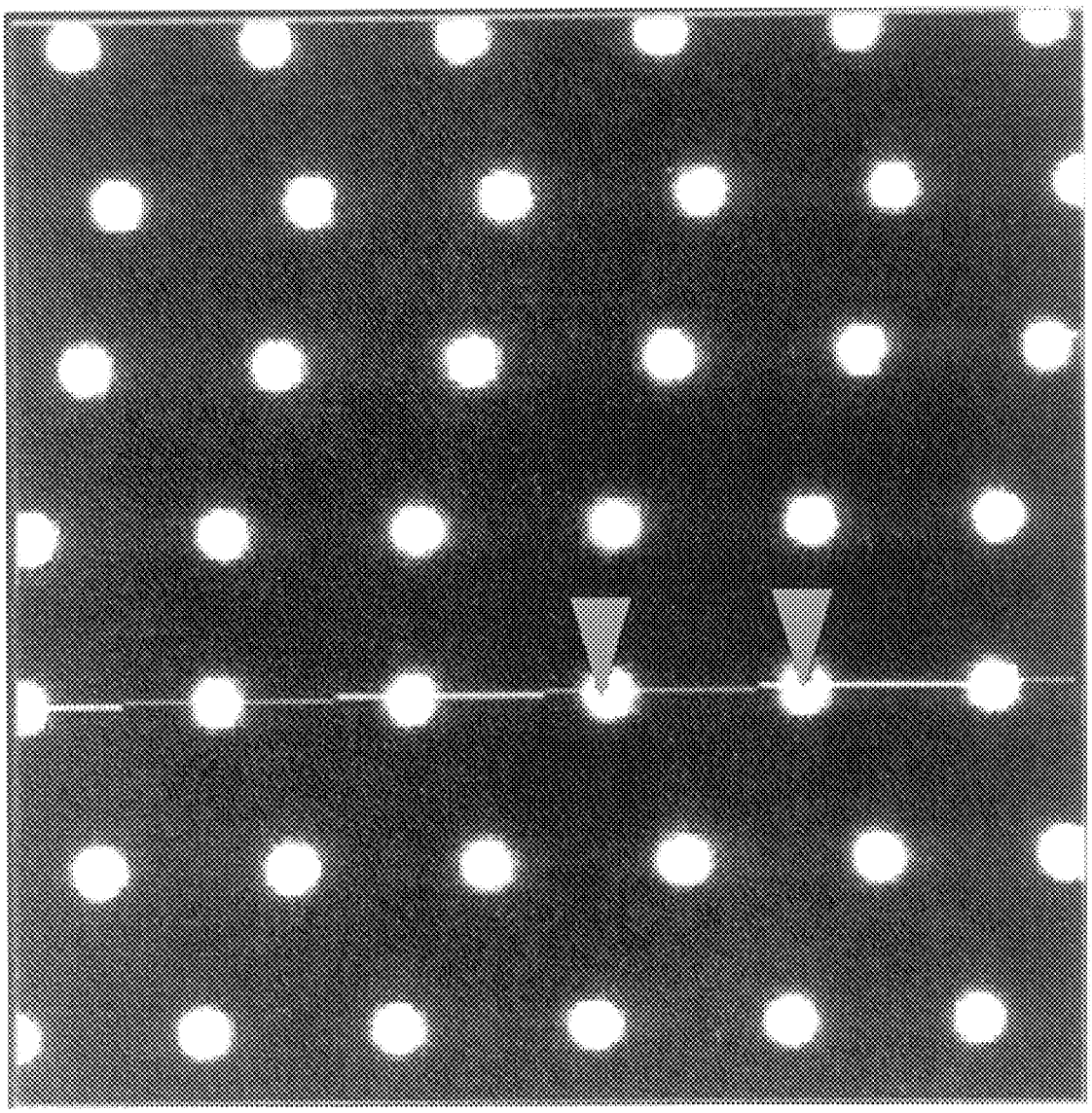
FIG. 3 is an SPM image of the surface potential distribution of the recording layer of the phase change recording disc wherein arrangement of the record marks formed on the recording layer is shown in terms of the surface potential distribution.
Figure 4:
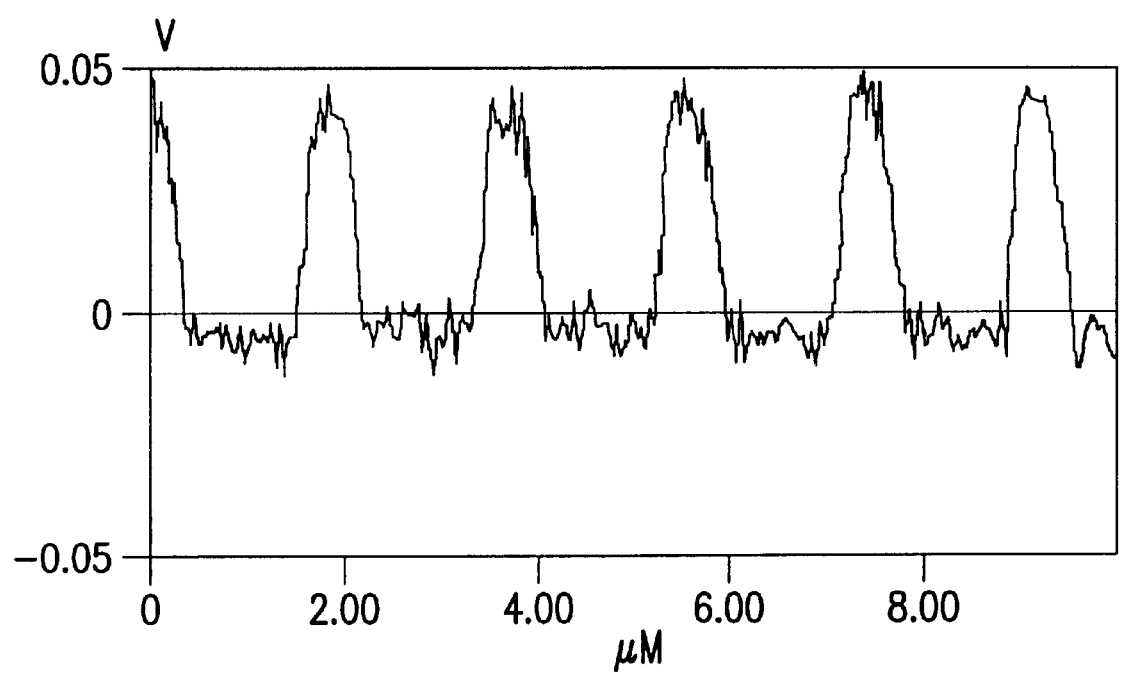
FIG. 4 shows signal pattern obtained upon reproduction of the row of the record marks along the white line indicated in the record mark arrangement pattern shown in FIG. 3.

In this disc, the difference in surface potential between the record marks formed and the region other than the record marks was about 50 mV as shown in FIG. 4. FIG. 4 is the signal pattern obtained upon reproduction of the row of the record marks along the white line of the record mark arrangement pattern in FIG. 3. It should be noted that FIG. 3 is the surface potential distribution pattern obtained by SPM as in the case of FIG. 1.

Example 2

The recorded disc used in Example 1 was measured for the capacitance in the record marks and the capacitance in the region other than the record marks to thereby find the difference therebetween. The capacitance was measured with a capacitance detection circuit by maintaining the distance between the probe and the recording layer surface at 10 nm. In this measurement, the difference in capacitance was $3 \times 10^{-10}$ μF.

BENEFITS OF THE INVENTION

As described above, the present invention has enabled to record the information at a high density in a convenient manner, and to read the information recorded at such high density.

Japanese Patent Application Nos. 1999/087133 and 1999/326089 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An information recording medium, comprising:

a substrate; and a film of material disposed on the substrate, wherein information recorded on the recording medium is read by detecting a difference in at least one of a crystallographic state, crystallographic phase, and constituent material based on a measured difference in at least one of surface potential and surface charge density of the recording medium, such that a need for preliminary forming a difference in electrical potential in the recording medium is eliminated.

2. A method for reading information recorded in a recording medium, comprising:

measuring a difference in at least one of surface potential and surface charge density of the recording medium; and detecting a difference in at least one of a crystallographic state, crystallographic phase, and constituent material of the recording medium based on the measured difference in the at least one of surface potential and surface charge density so as to read information recorded on the recording medium, such that a need for preliminary forming a difference in electrical potential in the recording medium is eliminated.

3. A method for reading information according to claim 2, wherein the recording medium comprises a phase change recording medium, and the method further comprises:

detecting differences between crystalline and amorphous regions of the recording medium based on the measured surface potential.

4. A system for reading information recorded in a recording medium, comprising:

a measuring mechanism configured to measure a difference in at least one of surface potential and surface charge density of the recording medium; and a detecting mechanism configured to detect a difference in at least one of a crystallographic state, crystallographic phase, and constituent material of the recording medium based on the measured difference in the at least one of surface potential and surface charge density so as to read information recorded on the recording medium, such that a need for preliminary forming a difference in electrical potential in the recording medium is eliminated.

5. A method for reading information according to claim 4, wherein the recording medium comprises a phase change recording medium, and the method further comprises:

detecting differences between crystalline and amorphous regions of the recording medium based on the measured surface potential.

* * * * *

UNITED STATES PATENT AND TRADEMARK OFFICE
CERTIFICATE OF CORRECTION

PATENT NO.    : 6,449,240 B1                                              Page 1 of 1
DATED         : September 10, 2002
INVENTOR(S)   : Kikukawa et al.

It is certified that error appears in the above-identified patent and that said Letters Patent is hereby corrected as shown below:

<u>Title page,</u>
Item [45] and the Notice information should read as follows:

-- [45] **Date of Patent: \*Sep. 10, 2002**

[\*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Twenty-fifth Day of March, 2003

JAMES E. ROGAN
*Director of the United States Patent and Trademark Office*